June 30, 1970 R. B. KEENEY 3,518,651
HOMING CONTROL FOR FLYING HEAD OF MAGNETIC SURFACE STORAGE SYSTEM
Filed March 10, 1969 2 Sheets-Sheet 1

INVENTOR.
Ronald B. Keeney
BY
Karl W. Lommemeyer
ATTORNEY

June 30, 1970 R. B. KEENEY 3,518,651

HOMING CONTROL FOR FLYING HEAD OF MAGNETIC SURFACE STORAGE SYSTEM

Filed March 10, 1969 2 Sheets-Sheet 2

United States Patent Office 3,518,651
Patented June 30, 1970

3,518,651

HOMING CONTROL FOR FLYING HEAD OF MAGNETIC SURFACE STORAGE SYSTEM

Ronald B. Keeney, San Leandro, Calif., assignor to The Singer Company, a corporation of New Jersey Filed Mar. 10, 1969, Ser. No. 805,557
Int. Cl. G11b 5/40, 5/54
U.S. Cl. 340—174.1 5 Claims

ABSTRACT OF THE DISCLOSURE

In a magnetic disc record system wherein the flying head settles onto the disc at a home position when the disc stops, the momentum of the disc is applied through a friction drive for homing the head, particularly upon power failure.

BACKGROUND OF THE INVENTION

Field of the invention

The present invention relates to magnetic surface storage discs with flying transducer heads.

Description of the prior art

It has been known that a magnetic recording surface is usually damaged if, while in motion, it is touched by the transducer head. Such contact heats the surface by friction, galls it, and transfers particles of the disc surface to the slider. Prior systems have lifted the head for shutdown, as in U.S. Pats. Nos. 3,310,792 and 3,149,337. U.S. Pat. No. 3,200,385, which similarly retracts the head, provides a so-called landing track, or noninformation track (actually a crash strip) consisting of one track of the magnetic record area reserved for use while the head is lowered into flying position, so that accidental hits caused by transitory instability during this troublesome drop into a flight position, will damage only the noninformation track.

It is proposed to cause the slider of a flying head to land on and take off from a noninformation, landing and sliding home track. Such an arrangement could land the slider on the record area of the disc in the event of power failure.

SUMMARY OF THE INVENTION

I utilize the mechanical momentum of the rotating disc for moving the transducer head to home position. I provide means, such as a solenoid magnet, responsive to the loss of power for engaging, preferably frictionally engaging, the disc with the head control mechanism for effecting the drive. The use of the system need not be limited to emergencies but can reliably and economically serve in all shutdowns.

DESCRIPTION OF THE DRAWINGS

These and other objects of the invention will be apparent from the following description of one specific embodiment, wherein.

DESCRIPTION OF THE PREFERRED EMBODIMENT

Figure 1:
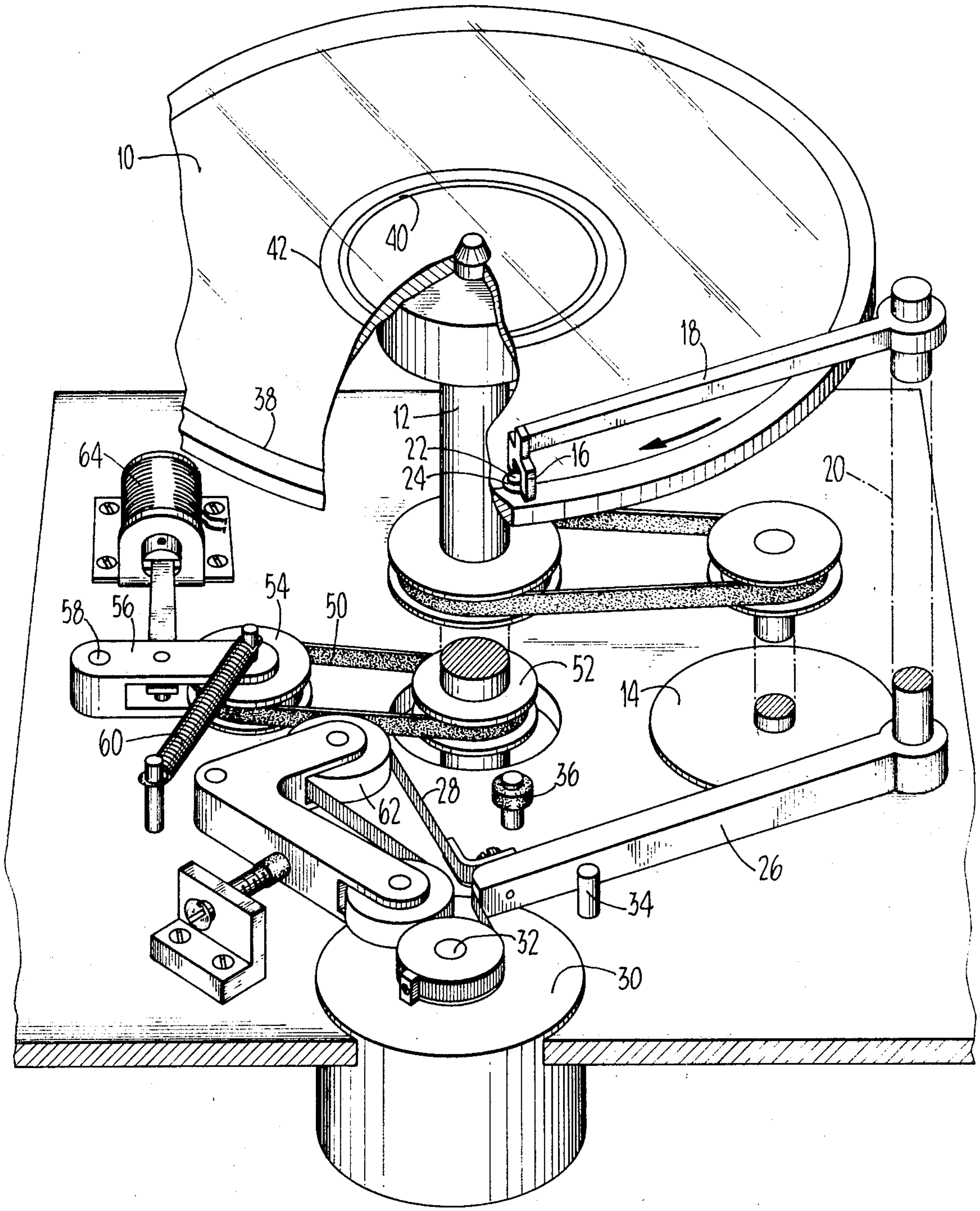
FIG. 1 is a partially exploded, pictorial view of a magnetic disc record system including its drive mechanism, under operating conditions.

In the partially exploded view of FIG. 1, a magnetic data surface-storage, recording disc 10 rests on a spindle 12 and is driven, clockwise in this view, by a motor 14. A magnetic transducer head 16 is located and guided over the disc 10 by an arm 18 carried by a vertical rotatable shaft 20. The transducer head 16 includes a slider 22 and a spring gimbal which supports the slider 22 and urges it toward the disc 10, for example, with a force of 150 to 200 grams. The gimbal 24 may be of the construction shown and described in the prior copending application of Meneley and Jones, Ser. No. 702,472, filed Feb. 1, 1968, now U.S. Pat. No. 3,489,381, dated Jan. 13, 1970. At the operating speed of the disc 10, such as 1200 revolutions per minute, the slider 22 rides or flies close to disc 10 on a thin film of air. As is known, the moving disc viscously drags air into the space between it and the face of the slider, which constitutes an air-bearing face, and builds up sufficient air pressure for supporting the slider against the bias of the spring. Typically, the slider 22 flies 50 to 100 microinches from the disc 10.

A second arm 26 on the shaft 20 is controlled through a steel strap 28 by a stepping motor 30 which may, for example, be of the construction shown and described in FIGS. 1 to 6 of Proctor Pat. No. 3,331,974. The shaft 32 of motor 30 rotates about three-quarters of a turn to swing the arm 26 between stops 34 and 36, so that the arm 18 carries the slider 22 of the transducer 16 between an outermost information track 38 on the disc 10, and an innermost track 40, which serves as a landing or sliding track as described in the prior copending application of Meneley and Jones, Ser. No. 740,535, filed June 27, 1968. The landing track 40 lies inside an innermost information track 42 and serves as the home position for the transducer head 16. When the disc 10 is stopped, the slider, in the home position of the transducer head 16, rests on the track 40. Then, as the motor 14 is energized and the disc 10 accelerated, the slider 22 slides on the track 40 until the disc 10 reaches the speed at which the slider begins to fly. When the disc is to be stopped, the transducer head is moved to its home, or innermost position and then, as the disc 10 is permitted to decelerate, the slider 20 gradually loses lift until it settles onto the track 40 and slides there until the disc 10 comes to a stop.

The slider 22 is spoken of as "flying" even though its action is not strictly analogous to that of an airplane. The slider 22 is spoken of as being "over" a track, its distance from the disc is spoken of as "flying height," and the supporting air pressure is referred to as "lift," whether the head is positioned above or below the recording disc.

Typically, the record disc 10 includes a smooth, flat, body disc of a substrate material, such as plate glass or nonmagnetic metal, and the magnetic storage surface consists of a thin film of a magnetic material laid over the substrate. This film is delicate, both mechanically and magnetically. Contact between the slider 22 and the moving disc 10 can damage the magnetic film, and can alter the pattern of its magnetization, which pattern constitutes the recorded information. Because the slider is supported as an air bearing only while the disc is in motion, it is highly desirable that the transducer head 16 be moved to its home position before the disc 10 decelerates so that, as the slider settles down on the disc, it will slide on the noninformation landing track 40. In normal operation, the system can be controlled for causing the step motor 30 to move the flying head 16 to home position, before the disc 10 is permitted to decelerate. However, in the event of a power failure, the motor 30 is not available for this purpose.

In accordance with this invention, the momentum of the rotating disc 10, spindle 12, and motor 14 are utilized for driving the head 16 to home position in the event of a power failure. Furthermore, the present invention can conveniently be used also for normal shutdowns.

Figure 2:
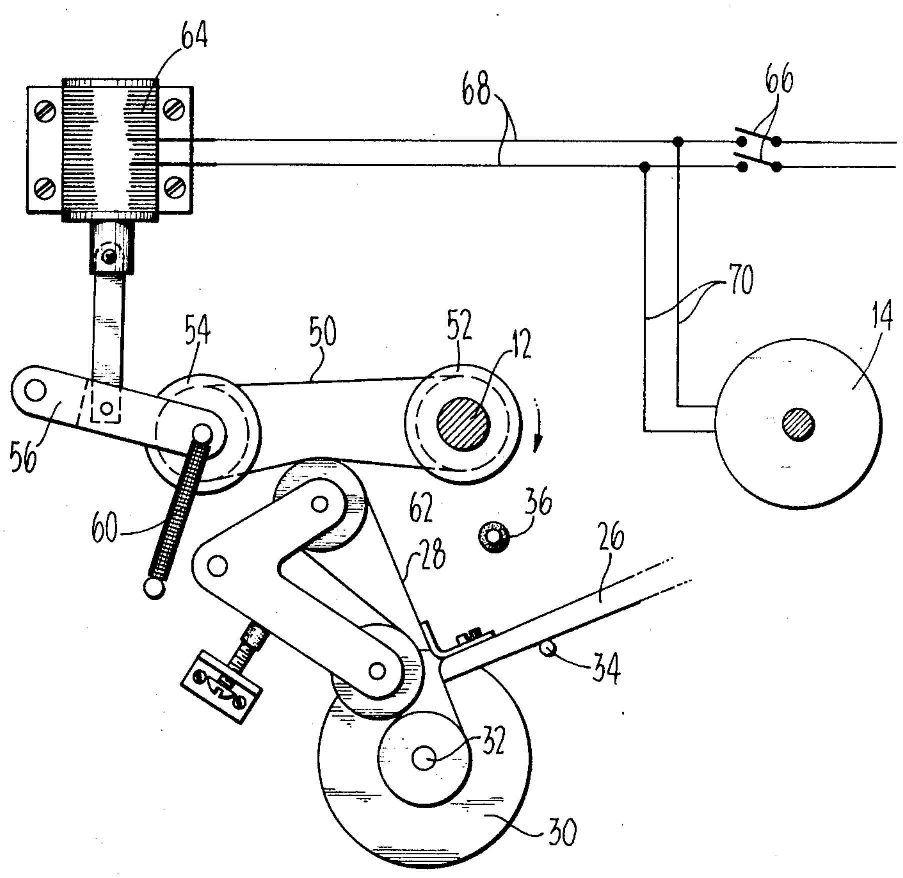
FIG. 2 is a plan of a detail of the apparatus of FIG. 1 with the homing drive engaged.

A light belt 50, FIG. 1, runs over a pulley 52 on the spindle 12 and over an idler pulley 54, carried by an arm 56, hinged at 58. A spring 60 biases the arm 56, clockwise in this view, for moving the belt 50 against the steel strap 28 where it runs over an idling and adjusting pulley 62. A solenoid magnet 64, when energized, rotates the arm 56 counter-clockwise, against the force of spring 60 for holding the belt 50 clear of the steel strap 28. During operation of the disc 10, the solenoid 64 is energized so that the belt 50 is free of, and disconnected from, the steel strap 28. Upon a power failure, the motor 14 will become de-energized and the disc 10 will begin to decelerate. The power failure will also de-energize the solenoid magnet 64 and permit the spring 60 to swing the arm 56 clockwise, and thereby draw the belt 50 into firm engagement with the steel strap 28, as shown in FIG. 2 to provide a frictional driving connection therewith. The momentum of the disc 10, spindle 12, and motor 14 rotating clockwise as seen in FIG. 2, drives the steel strap 28 and its idler pulley 62 counter-clockwise for, in turn, driving the arm 26 up, as seen in FIG. 2, for carrying the arm 18 and the transducer head 16 toward the center of the disc, as seen in FIG. 1. The motion of arm 26 is stopped by the post 36. The belt 50 then slides over the steel strap 28 and, in so doing, holds the arm 26 against the stop 36 while the disc 10 comes to a stop with the slider 22, FIG. 1, coming to rest on the landing track 40. Only a few revolutions of the disc 10 are required for swinging the arms 26 and 18 through their full range of motion. Accordingly, the slider 22 will have been brought over the landing track 40 well before the time at which the disc 10 will have slowed enough to cause the slider 22 to settle into contact with the disc 10.

As is also shown in FIG. 2, power is applied through a switch 66 to both the disc drive motor 14 and the solenoid 64, which are connected electrically in parallel by conductors 68 and 70. With this arrangement, the solenoid 64 is de-energized each time the motor 14 is de-energized for stopping the disc 10 and, accordingly, the belt 50 is brought into engagement with the steel strap 28 for moving the transducer head 16 into the home position, even in routine shutdowns.

I claim:

1. In combination in a surface storage apparatus, (a) a transducer head, (b) a power-driven rotatable storage member having a storage field over which said head moves for transfer of data between said head and storage member, (c) shift means for guiding said head and for shifting it between at least one operable position with respect to said storage field and a home position, (d) means for moving said transducer head to said home position upon loss of power, comprising (1) an engageable coupler between said storage member and said shift means operable when engaged to cause said storage member, when rotating, to drive said guide means toward said home position, (2) means for biasing said coupler into engagement, and (3) means responsive to an application of power to said rotatable storage member for holding said coupler disengaged.

2. In combination in a magnetic-surface, data-storage apparatus, (a) a flying transducer head (b) a power-driven, rotatable storage member having a magnetic storage field over which said head moves for noncontact recording and reading of data, (c) shift means for guiding said head and for shifting it between at least one operable position with respect to said storage field and a nonoperative, protective, home position, (d) means for protecting said storage field and flying head from damage-proof contact due to slowing of said storage member upon loss of power, comprising (1) an engageable coupler between said storage member and said shift means operable when engaged to cause said storage member, when rotating, to drive said guide means toward said home position, (2) means for biasing said coupler into engagement, (3) and means responsive to an application of power to said rotatable storage member for holding power to said rotatable storage member for holding said coupler disengaged.

3. The combination of claim 2 wherein a stop member is included for stopping said shift means when said transducer is at said home position, and wherein said coupler includes a yieldable means for limiting the force applied by said rotatable member to said shift means.

4. The combination of claim 2 wherein a stop member is included for stopping said shift means when said transducer is at said home position, and wherein said coupler includes impositve drive means for permitting said rotatable member to continue rotating after said shift means and transducer have been stopped in said home position by said stop member.

5. The combination of claim 2 wherein a stop member is included for stopping said shift means when said transducer is at said home position, and wherein said coupler element includes a friction slip element for limiting the force applied by said rotatable member to said shift means, and for permitting said rotatable member to continue rotating after it has driven said shift means to said home position and against said stop.

References Cited

UNITED STATES PATENTS

| | | | |
|---|---|---|---|
| 2,862,781 | 12/1958 | Baumeister | 340—174.1 |
| 3,180,943 | 4/1965 | Van Oort | 340—174.1 |

JAMES W. MOFFITT, Primary Examiner

V. P. CANNEY, Assistant Examiner